United States Patent
Hundegger

(10) Patent No.: US 9,815,164 B2
(45) Date of Patent: Nov. 14, 2017

(54) WOOD-WORKING MACHINE AND METHOD FOR THE OPERATION THEREOF

(71) Applicant: Hans Hundegger, Hawangen (DE)

(72) Inventor: Hans Hundegger, Hawangen (DE)

( * ) Notice: Subject to any disclaimer, the term of this patent is extended or adjusted under 35 U.S.C. 154(b) by 714 days.

(21) Appl. No.: 14/372,071

(22) PCT Filed: Jan. 10, 2013

(86) PCT No.: PCT/EP2013/050384
§ 371 (c)(1),
(2) Date: Jul. 14, 2014

(87) PCT Pub. No.: WO2013/104706
PCT Pub. Date: Jul. 18, 2013

(65) Prior Publication Data
US 2015/0047744 A1    Feb. 19, 2015

(30) Foreign Application Priority Data

Jan. 14, 2012 (DE) .................. 10 2012 000 606

(51) Int. Cl.
*B27M 1/08* (2006.01)
*B23Q 7/05* (2006.01)
*B23Q 17/22* (2006.01)

(52) U.S. Cl.
CPC ............. *B23Q 17/22* (2013.01); *B23Q 7/055* (2013.01); *B27M 1/08* (2013.01)

(58) Field of Classification Search
CPC ........... B23Q 17/22; B23Q 7/055; B27M 1/08
(Continued)

(56) References Cited

U.S. PATENT DOCUMENTS 3,833,033 A * 9/1974 Hurn .................. B27M 1/08
144/2.1
4,106,538 A * 8/1978 Sigfridsson .............. B23Q 7/18
144/242.1
(Continued)

FOREIGN PATENT DOCUMENTS

DE       3143867 A1    5/1983
DE       3609331 C1    12/1986
(Continued)

OTHER PUBLICATIONS

Written Opinion published Jul. 14, 2014 for PCT/EP2013/050384 filed on Jan. 10, 2013.
(Continued)

*Primary Examiner* — Douglas Hess
(74) *Attorney, Agent, or Firm* — Paul D. Bianco; Fleit Gibbons Gutman Bongini & Bianco PL

(57) ABSTRACT

A wood-working machine, which contains at least one processing unit, a workpiece support having at least one front support area arranged in front of the processing unit in the feeding direction of a workpiece and one rear support area arranged behind the processing unit in the feeding direction of the workpiece, and a transporting device, which has a front transporting unit arranged on the front support area and a rear transporting unit arranged on the rear support area for moving and positioning the workpiece lying on the workpiece support in a first linear axis (X axis), wherein the front and rear transporting units includes at least one transporting roller that can be placed against the top side of the workpiece, and wherein a measuring system, which is integrated into the front or rear support area and has a measuring belt or measuring chain pressed against the bottom side of the workpiece for detecting the motion of the
(Continued)

workpiece in the first linear axis, is associated with each transporting unit.

7 Claims, 1 Drawing Sheet

(58) Field of Classification Search
USPC .......................... 198/502.2, 502.3; 144/357
See application file for complete search history.

(56) References Cited

U.S. PATENT DOCUMENTS

| | | | | |
|---|---|---|---|---|
| 4,441,537 A * | 4/1984 | Vartiainen | ............... | B27B 31/06 144/242.1 |
| 4,736,511 A | 4/1988 | Jenkner | | |
| 4,881,584 A * | 11/1989 | Wislocker | ............... | B27B 1/007 144/245.2 |
| 4,907,632 A * | 3/1990 | Reuter | ...................... | B27C 5/08 144/246.1 |
| 4,943,328 A * | 7/1990 | Quick | ...................... | B07C 5/14 156/360 |
| 6,196,283 B1 * | 3/2001 | Hundegger | ........... | B23D 47/045 144/242.1 |
| 6,220,423 B1 * | 4/2001 | Gagnon | ................ | B27B 31/006 198/460.1 |
| 6,366,351 B1 * | 4/2002 | Ethier | ................ | G01N 21/8986 356/237.1 |
| 6,640,855 B2 * | 11/2003 | Giles | ....................... | B27B 27/00 144/2.1 |
| 7,374,376 B2 | 5/2008 | Jonsson et al. | | |
| 7,661,451 B2 | 2/2010 | Hundegger | | |
| 8,690,500 B2 | 4/2014 | Spichtinger et al. | | |
| 9,364,865 B2 * | 6/2016 | Kim | ........................ | B07C 3/02 |
| 2005/0121109 A1 | 6/2005 | Hundegger | | |
| 2006/0072977 A1 | 4/2006 | Jonsson et al. | | |
| 2011/0081212 A1 | 4/2011 | Spichtinger et al. | | |

FOREIGN PATENT DOCUMENTS

| | | |
|---|---|---|
| DE | 8714080 U1 | 12/1987 |
| DE | 8804018 U1 | 7/1988 |
| DE | 3912503 | 3/1990 |
| DE | 19920006 A1 | 12/1999 |
| DE | 19831284 A1 | 1/2000 |
| DE | 19831984 A1 | 2/2000 |
| DE | 20007999 U1 | 11/2000 |
| DE | 20200556 U1 | 4/2002 |
| DE | 20203488 U1 | 9/2002 |
| DE | 10 2005 012025 | 12/2006 |
| DE | 102008021997 A1 | 11/2009 |
| DE | 102008036974 A1 | 2/2010 |
| DE | 10 2009 048010 | 2/2011 |
| DE | 10 2010 028 561 | 11/2011 |
| EP | 0319032 A2 | 6/1989 |
| EP | 0561227 A1 | 9/1993 |
| EP | 0562216 A1 | 9/1993 |
| EP | 0724939 A1 | 8/1996 |
| EP | 0813941 A2 | 12/1997 |
| EP | 0816029 A2 | 1/1998 |
| EP | 0960705 A2 | 12/1999 |
| EP | 1405693 A2 | 4/2004 |
| FR | 1019411 | 1/1953 |
| WO | 8400715 A1 | 3/1984 |
| WO | 2006/033616 | 3/2006 |

OTHER PUBLICATIONS

International Preliminary Report dated Jul. 15, 2014 for PCT/EP2013/050384 filed on Jan. 10, 2013.
International Search Report for PCT/EP2013/050384 dated Jul. 18, 2013.
Results of Examination Report for DE 10 2012 000 606.3, filed Jan. 14, 2012.

* cited by examiner

WOOD-WORKING MACHINE AND METHOD FOR THE OPERATION THEREOF

FIELD OF THE INVENTION

The invention concerns a wood-working machine. The invention also concerns a method for the operation of such a wood-working machine.

BACKGROUND OF THE INVENTION

Wood-working machines for the processing of long specimens, such as beams, boards, panels, or the like usually have one or more processing units, a work support, and a transporting device for the movement and positioning of the workpieces lying on the workpiece support, relative to the processing unit in a linear axis. The motion of the workpiece for the precise positioning of the workpiece with the known wood-working machines is detected, for example, by a measuring roller located in the feed device of the workpiece, in front of the processing unit.

SUMMARY OF THE INVENTION

A wood-working machine and a method for the operation of such a wood-working machine that allow a more precise detection and control of the motion of the workpiece and thus a more precise processing are disclosed herein.

The wood-working machine in accordance with the invention has a front transporting unit on a front support area, located in the feed direction of a workpiece in front of the processing unit, and a rear transporting unit on a rear support area, located in the feed direction of the workpiece behind the processing unit, for the movement and positioning of the workpiece in a first linear axis, wherein a measuring system, integrated into the front or rear support areas, for the detection of the motion of the workpiece, in the first linear axis, is associated with each transporting unit. By means of the measuring systems integrated in the front and rear support areas, it is always possible to detect the motion of a workpiece lying on the support during a processing on the entire length by at least one measuring system and, in this way, to control the transporting device for the precise positioning of the workpiece relative to the processing unit. Thus, for example, a workpiece still lying on the rear support area can be processed, still controlled on a rear front side, whereas a new workpiece is already being transported closer for the subsequent processing in the front support area. Depending on the requirements, it is also possible to switch from one to the other measuring system for the controlled positioning of the workpiece. If the workpiece rests on both support areas, both measuring systems can also be used, wherein the measurement values can be calculated or can be compared as a check. In this way, a redundant and more precise measurement for the improvement of the processing accuracy can be obtained. Even if a longer component is separated in the middle, the two components thus formed can be further processed, transported, and measured independently of one another.

In a particularly appropriate embodiment, the front and/or rear support areas can be moved or positioned with the individual measuring system relative to the processing unit. In this way, the gap required for the individual processing goal or the tool can be kept as small as possible between the front and the rear support areas. The support areas can thus be optimally positioned and moved, in a coordinated manner, together with the transporting devices and the measuring systems. The measuring devices can be positioned on any sites on the workpiece, without thus, however, changing the position of the workpiece within the wood-working machine.

In another advantageous embodiment, the measuring systems have a measuring belt, a chain, or another tension element pressed against the bottom side or the top side of the workpiece, to be carried by the workpiece. The measuring belt can, for example, be preferably pressed by pressing elements, carried with the measuring belt, against the workpiece. In this way, a slip-free connection can be obtained between the measuring belt or the measuring chain and the workpiece, without sliding friction appearing between the pressing element and the measuring belt or the measuring chain. Thus, the motion of the workpiece can be determined precisely and in a slip-free manner.

Appropriately, at least one workpiece detection sensor for the control of the front transporting unit and a zero setting photoelectric barrier are located on the front support area in the feed direction of the workpiece. The lowering of the transport rollers onto the workpiece, for example, can be controlled via the workpiece detection sensors.

With the wood-working machine in accordance with the invention, the motion of the workpiece during the processing by the processing unit is detected by at least one of the measuring systems integrated in the front or rear support areas, or by both measuring systems. The measuring and transporting systems can be alternated or supplemented in such a manner that the optimal position with respect to the workpiece is always obtained. The sequence or selection can be based on the processing operations and the characteristics of the workpiece.

BRIEF DESCRIPTION OF THE DRAWINGS

Special features and advantages of the invention can be deduced from the following description of a preferred embodiment example with the aid of the drawing. The figures show the following.

DETAILED DESCRIPTION OF THE INVENTION

Figure 1:
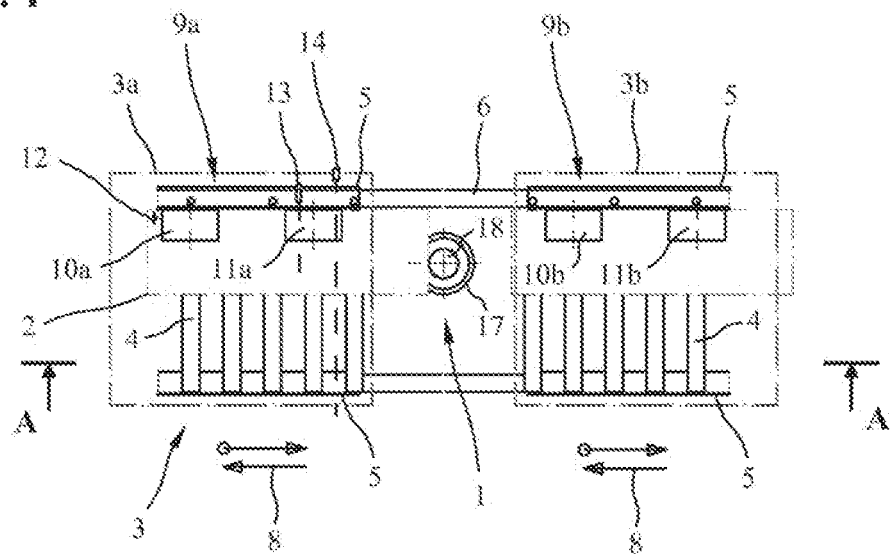
FIG. 1, a schematic representation of a wood-working machine in a top view.
Figure 2:
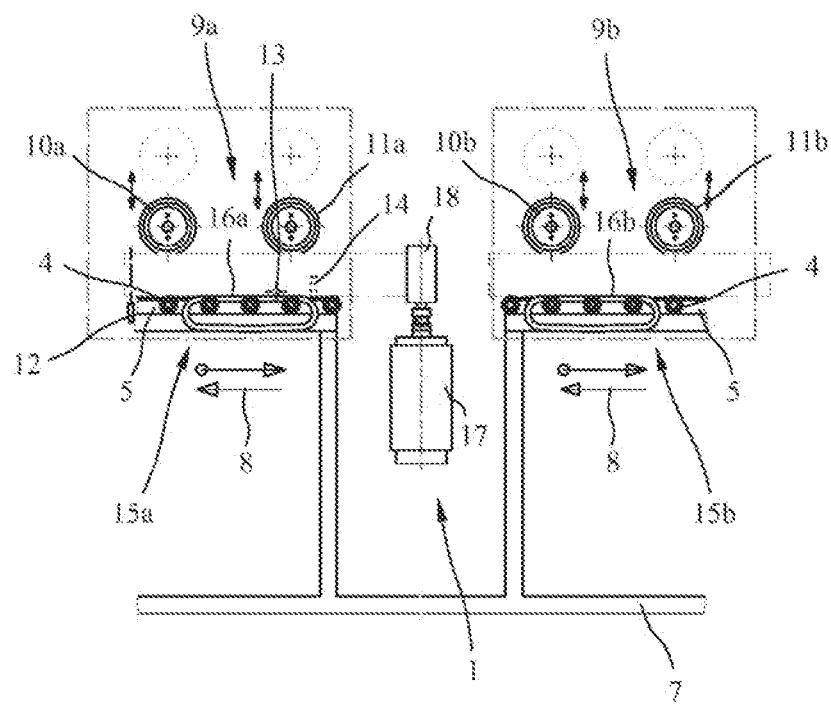
FIG. 2, a side view of the wood-working machine in a section A-A of FIG. 1.

The wood-working machine, schematically shown in a top view and in a side sectional view in FIGS. 1 and 2, contains at least one processing unit 1, which is located between a front support area 3a of a workpiece support 3, lying in the feed direction of a workpiece 2 before the processing unit, and a rear support area 3b, lying in the feed direction of the workpiece 2 behind the processing unit. The workpiece support 3 is constructed as a roller track in the depicted embodiment, in which, in a known manner, a plurality of successive transport rollers 4 are supported between parallel tracks 5 such that they can rotate. The tracks 5 and a linear fence 6 for the side placement of the workpiece 2, lying on the transport rollers 4, are located on a frame 7, which is constructed, for example, as a welded structure. In the depicted embodiment, the front and rear support areas 3a and 3b are placed on the frame 7 such that they can be moved and be positioned horizontally in the direction of the arrows 8, so that the gap between the front and rear support areas 3a and 3b can be maintained as small as possible, as a function of the individual processing, and the workpiece support can be carried out as close as possible to the processing site.

The wood-working machine also contains a transporting device 9, with which the workpiece 2, lying on the transport rollers 4, can be moved relative to the processing unit 1 in a first linear axis (X axis), horizontally along the linear fence 6. In the depicted embodiment, the transporting device 9 consists of two separate and separately controllable transporting units 9a and 9b, which are associated with the front and rear support areas 2a and 2b. The front transporting unit 9a is located in front of the processing unit 1 as seen in the feed direction of the workpiece 2, whereas the rear transporting unit 9b is downstream from the processing unit 1. Each transporting unit 9a and 9b contains two transport rollers 10a, 11a and 10b, 11b, which are driven by motors, not shown, and can be adjusted separately for lowering onto the workpiece 2 or for raising from the workpiece 2 in a vertical direction. The transport rollers 10a, 11a, 10b, and 11b can have a surface made of a high-friction material, so that, if at all possible, there is no slippage between the transport rollers 10a, 11a, 10b, and 11b and the workpiece 2 during its transport. For the lowering onto the workpiece or the raising from the workpiece 2, the transport rollers 10a, 11a, and 10b, 11b, for example, can be located on swiveling arms or on vertical guides.

Two workpiece detection sensors 12 and 13 have been placed on the rear transporting unit 9a, shown to the left in FIGS. 1 and 2. A first workpiece detection sensor 12 is upstream from the front transport roller 10a as seen in the feed direction of the workpiece 2. A second workpiece detection sensor 13 is located between the front transport roller 10a and the rear transport roller 11a of the front transporting unit 9a as seen in the feed direction of the workpiece 2. Furthermore, a zero setting photoelectric barrier 14 is placed on the front transporting unit 9a.

Moreover, a respective measuring system 15a or 15b for the detection of the motion of the workpiece 2 is associated with the front and rear support areas 3a and 3b. In the depicted embodiment, the measuring system consists of a measuring belt 16a or 16b, which is pressed, by pressing elements moved along with the measuring belt 16a or 16b, against the bottom side of the workpiece 2 and is conducted over deflection rollers, not shown. By detection of the rotary movement of a deflection roller, it is possible, for example, to determine the movement of the measuring belt and thus the movement of the workpiece. Since the pressing elements move along with the measuring belt 16a or 16b, they can be pressed against the workpiece 2 to obtain a slip-free connection, without sliding friction occurring between the pressing element and the measuring belt. Thus, for example, the movement of a workpiece 2 can be determined precisely and in a slip-free manner.

The pressing elements determined for the pressing of the measuring belt 16a and 16b against the bottom side of the workpiece 2 can be connected to one another, for example, to form a continuous chain and can be conducted via at least two chain deflection wheels. Appropriately, the two chain deflection wheels lying in one plane are arranged in a plane between two upper deflection disks of the measuring belt in such a way that the pressing elements are placed on the inside of the span of the measuring belt 16a and 16b, running between the two deflection disks.

The processing unit 1, located between the front support area 3a and the rear support area 3b, has a processing unit 17, which can move in two linear axes at right angles to one another, and which can swivel around three rotary axes, to hold at least one processing tool 18. By means of these movement possibilities, it is possible, for example, to move a processing unit 17 equipped with a milling or boring tool or another processing tool to all sides of the workpiece 2 and to swivel it in such a manner that the processing tool 18 also stands vertical, or at any angle, with respect to the individual sides or can be brought to it at all sides. In this way, for example, grooves, boreholes, or other indentations can be produced on the top and bottom sides, the front and rear sides, and the two end sides of a workpiece 2 without turning the workpiece over. Thus, a 6-sided processing of the workpiece with a plurality of processing possibilities and with maximum flexibility can take place simply and quickly.

In a particularly appropriate embodiment, the processing unit has a carrier that can be moved in a second linear axis (Y axis), which is at right angles to the first linear axis (X axis), and a third linear axis (Z axis), which is at right angles thereto. On the carrier, the processing unit 17 is situated such that it can swivel around three rotary axes (A axis, B axis, C axis). The carrier is appropriately designed as a horizontal transverse carrier, but can also be situated vertically.

The mode of operation of the wood-working machine described in the preceding is as follows:

When the first workpiece detection sensor 12 detects a workpiece fed automatically or manually, the first transport roller 10a of the front transporting unit 9a in the feed direction is lowered onto the workpiece, so that the first transport roller 10a moves the workpiece along the linear fence 6 in the first linear axis (X axis) in the direction of the processing unit 1. When the workpiece 2, transported by the first transport roller 10a, arrives in the area of the measuring belt 16a, the movement of the workpiece 2 is detected by the front measuring system 15a. As soon as the second workpiece detection sensor, located in the area of the measuring system 15a, detects the workpiece 2, the second transport roller 11a is lowered onto the workpiece and takes over the transporting of the workpiece 2. The first transport roller 10a can then either lift off from the workpiece 2 or both transport rollers can synchronously convey the workpiece 2.

When the workpiece 2 passes the zero setting photoelectric barrier 14, the workpiece front edge is recognized and the control for the subsequent processing can be correspondingly synchronized (set to zero). The exact component front edge can also be set precisely by a first front processing.

If, with its further transport, the workpiece 2 arrives in the area of the measuring belt 16b on the rear measuring system 15b, the second measuring system can take over the detection of the movement of the workpiece. As long as the workpiece 2 is still in contact with the two measurement belts 16a and 16b, the measurement values of the two measuring systems 15a and 15b can be calculated or controlled, wherein a redundant and more precise measuring system with an increased processing accuracy can be obtained. In the further course of the processing, the different transporting systems 9a and 9b and the measuring systems 15a and 15b can be alternated in such a way that the optimal position on the workpiece 2 is always obtained. The sequence can be based according to the processing operations and the characteristics of the workpiece 2.

The invention claimed is:

1. A wood-working machine, which contains at least one processing unit, a workpiece support with at least one front support area situated in front of the processing unit in the feed direction of a workpiece and a rear support area situated behind the processing unit in the feed direction of the workpiece, and a transporting device with a front transporting unit, situated on the front support area, and a rear transporting unit, situated on the rear support area, for the moving and positioning of workpiece lying on the workpiece support in a first linear axis, wherein the front and rear transporting units comprise at least one transporting roller, which can be adjusted separately in a vertical direction with respect to the top side of the workpiece, and wherein a measuring system, which is integrated into the front or rear support areas, with a measuring belt or a measuring chain, which is pressed on the bottom side of the workpiece, for the detection of the movement of the workpiece in the first linear axis, is associated with each transporting unit.

2. The wood-working machine according to claim 1, wherein the front and/or rear support areas with the individual measuring system can be moved and can be positioned with respect to the processing unit.

3. The wood-working machine according to claim 1, wherein the front and rear transporting units can be controlled separately.

4. The wood-working machine according to claim 1, wherein each of the front and rear transporting units contains a front and a rear transport roller.

5. The wood-working machine according to claim 1, wherein at least one workpiece detection sensor for the control of the front transporting unit is situated on the front support area in the feed direction of the workpiece.

6. The wood-working machine according to claim 1, wherein a zero setting photoelectric barrier is situated on the front support area in the feed direction of the workpiece.

7. A method for the operation of a wood-working machine according to claim 1, wherein the movement of the workpiece is detected during the processing by the processing unit by at least one of the measuring systems integrated into the front or rear support areas, or by both measuring systems.

* * * * *